United States Patent [19]

Franks, Jr.

[11] 4,291,009
[45] Sep. 22, 1981

[54] CATALYTIC PROCESS FOR THE PRODUCTION OF ALKALI METAL STANNATES

[75] Inventor: John A. Franks, Jr., Vermilion, Ohio

[73] Assignee: Vulcan Materials Company, Birmingham, Ala.

[21] Appl. No.: 161,507

[22] Filed: Jun. 19, 1980

Related U.S. Application Data

[63] Continuation of Ser. No. 48,828, Jun. 15, 1979, abandoned.

[51] Int. Cl.$^3$ ............................................. C01G 19/00
[52] U.S. Cl. .................................... 423/593; 423/89; 423/98
[58] Field of Search ...................... 423/98, 593, 89, 90

[56] References Cited

U.S. PATENT DOCUMENTS

| | | | |
|---|---|---|---|
| 107,711 | 9/1870 | Ott | 423/593 |
| 1,708,392 | 4/1929 | McIlhenney | 423/593 |
| 1,902,735 | 3/1933 | Tamuru et al. | 423/98 |
| 2,011,305 | 8/1935 | Smith | 423/593 |
| 2,355,777 | 8/1944 | Benson et al. | 423/593 |
| 2,416,709 | 3/1947 | Muskat | 423/98 |
| 2,434,283 | 1/1948 | Muskat | 423/98 |
| 2,434,284 | 1/1948 | Muskat | 423/98 |
| 3,152,888 | 10/1964 | Lunkardt | 423/593 |
| 3,394,061 | 7/1968 | De Forest et al. | 423/98 |
| 4,066,518 | 1/1978 | Horn | 423/593 |

*Primary Examiner*—Herbert T. Carter
*Attorney, Agent, or Firm*—Burns, Doane, Swecker & Mathis

[57] ABSTRACT

Tin salts, such as, for example, alkali metal stannates, are produced by contacting at elevated temperatures an aqueous alkaline solution, such as for example, alkali metal hydroxide solutions, with a tin-containing material in the presence of a reaction promotor comprising the combination of activated carbon and an oxygen supplying agent.

12 Claims, 3 Drawing Figures

CATALYTIC PROCESS FOR THE PRODUCTION OF ALKALI METAL STANNATES

This is a continuation, of Application Ser. No. 48,828, filed June 15, 1979 and now abandoned.

BACKGROUND OF THE INVENTION

The present invention relates to a process for the production of tin salts. It particularly relates to a process for the production of tin salts such as alkali metal stannates by reacting a tin-containing material with an alkaline solution.

As is well known in the art, tin salts and particularly alkali metal stannates, are highly valuable commercial commodities, finding use in electrolytic baths for the high speed electrotinplating of steel strip. Heretofore, however, the prior art has been unable to develop a satisfactory process for the production of these compounds. The direct reaction of tin metal with an alkali metal hydroxide solution has proven to be commercially impractical due to the extremely slow rate of reaction at room temperature, even with vigorous agitation. It is known to add sodium nitrite or nitrate as oxidizing agents to the direct contact reaction mixture which, while improving the oxidation efficiency of the reaction and oxidizing any stannites present (which stannites adversely affect plating quality) adds impurities and may deleteriously affect the reaction vessel and surrounding atmosphere.

Exemplary of such direct contact processes are the processes disclosed in U.S. Pat. Nos. 1,902,735; 2,416,709; 2,434,283; 2,434,284; and 2,570,473. These patents all teach processes wherein a tin-containing ore is smelted at temperatures of approximately 850° C. in the presence of a small quantity of a reducing agent, such as carbon, to convert the tin present in the ore into an acid and alkali soluble form. The resultant smelted mass is thereafter treated with an aqueous sulfuric acid or alkali metal hydroxide solution to produce either stannous sulfate or an alkali metal stannate. U.S. Pat. Nos. 2,416,709 and 2,434,284 also suggest that the treating solution may contain an oxidizing agent, such as hydrogen peroxide or a soluble nitrate or nitrite in order to accelerate the rate of reaction.

It has also been suggested that alkali metal stannates and stannous sulfate may be produced by contacting tin metal with an acid or alkaline solution in the presence of air. See for example, U.S. Pat. Nos. 121,948; 974,463; 2,436,974; and 2,726,929. However, even with the use of air, the rate of reaction is still undesirably slow, and precludes effective commercial use of this method. Moreover, sparging the solution with air leads to an increase in degradation products and other undesirable impurities.

As a consequence of the slow reaction rate and impurity problems associated with the direct contact method, tin salts have conventionally been commercially produced by other processes. U.S. Pat. No. 3,432,256 discloses a two-step method for the preparation of stannous fluoborate wherein a stannic fluoborate solution is first prepared by contacting tin with an aqueous fluoborate solution in the presence of oxygen, and is then reduced to stannous fluoborate by reduction with tin metal in the absence of oxygen.

A further disadvantage of the prior art direct contact type processes arises in their use to prepare tin salts for electroplating operations. These processes have been found to produce a tin salt product containing undesirably high concentrations of impurities. For tin plating applications, the presence of impurities is particularly undesirable, resulting in poor plating quality.

One approach to this problem of impurities, at least with respect to the production of sodium stannate, is disclosed in U.S. Pat. No. 3,394,061. This patent teaches a process for the production of sodium stannate wherein a tin-containing material is first treated with hydrochloric acid to leach and convert the tin values present therein to stannic chloride. The resulting stannic chloride solution is passed through a bed of activated carbon which preferentially absorbs the stannic chloride from the solution. The stannic chloride is then diluted from the activated carbon bed with an aqueous solution of sodium hydroxide, which converts the stannic chloride to sodium stannate.

It has also been suggested by Brinkmann in "Katalytische Wirkungen Von Aktivkohle", Kolloid-Zeitschrift (1951), pages 116 to 129, that activated carbon may have a catalytic effect on the oxidation of metals by atmospheric oxygen.

The prior art has yet to develop, however, an efficient and economical direct contact type process for the production of tin salts. Accordingly, in view of the large commercial importance of tin salts, and particularly alkali metal stannates, there exists a great need in the art for an economical and efficient method for the production of these compounds.

OBJECTS AND SUMMARY OF THE PRESENT INVENTION

Accordingly, it is an object of the present invention to provide an improved process for the production of tin salts.

It is a particular object of the present invention to provide a more efficient and economical process for the production of alkali metal stannates.

A further object of the present invention is to provide a process for the production of the aforementioned alkali metal stannates having a minimum amount of impurities and alkali metal stannites present therein.

Yet another object of the present invention is to provide a quick, one-step method for the production of alkali metal stannates.

It is a specific object of the present invention to provide a catalytic process for the production of alkali metal stannates by the direct reaction of a tin-containing material with an alkaline solution.

In accomplishing the foregoing and other objects, there has been provided in accordance with the present invention an improved process for the production of tin salts by the steps of contacting an excess of a tin-containing material with an alkali metal hydroxide solution at a temperature of from about 150° F. up to the boiling point of the solution, and recovering the resulting alkali metal stannate solution, the improvement comprising contacting the tin-containing material with the aqueous alkali metal hydroxide solution in the presence of an amount sufficient to promote the conversion of the tin-containing material to the tin salt of a reaction promotor comprising the combination of activated carbon and a molecular oxygen supplying agent.

In another, preferred, embodiment, the present invention also provides a process for the production of alkali metal stannates, comprising the steps of contacting at a temperature of from about 150° F. to 235° F. an aqueous alkali metal hydroxide solution with an excess of metallic tin in the presence of an amount sufficient to promote the conversion of the metallic tin to alkali metal stannates of a reaction promotor comprising the combination of activated carbon and a molecular oxygen supplying agent, and then recovering the resulting alkali metal stannate solution.

In a particularly preferred embodiment, the instant invention additionally provides a process for the production of alkali metal stannates selected from the group consisting of sodium and potassium stannates, comprising the steps of contacting at a temperature of from about 150° to 235° F. an alkali metal hydroxide solution selected from the group consisting of sodium and potassium hydroxide solutions with an excess of metallic tin in a form having a specific surface area of at least 0.1 cm$^2$/gram in the presence of a reaction promotor comprising the combination of activated carbon and a molecular oxygen supplying agent for a period of time sufficient to produce an alkali metal stannate solution, the activated carbon of the reaction promotor being utilized in an amount of from about 1 to 15 percent by weight of metallic tin, and the molecular oxygen supplying agent being utilized in an amount sufficient to provide a flow rate of from 0.02 to 0.4 liters oxygen/min./liter of slution; and recovering the resulting alkali metal stannate.

With the use of the process of the present invention high purity alkali metal stannates can be efficiently and economically produced in a single step by contacting an alkali metal hydroxide solution with a mass of tin-containing material at elevated temperatures in the presence of a reaction promotor comprising the combination of activated carbon and a molecular oxygen supplying agent. In addition, through the use of the process of the instant invention, an aqueous solution of alkali metal stannate containing a minimum amount of impurities may be efficiently produced with a very high rate. Moreover, with the instant process, the reaction rates are sufficiently high that no mechanical agitation is necessary, a feature which accrues a further reduction in equipment and production costs. Accordingly, the process of the instant invention provides a highly suitable method for the production of alkali metal stannates.

The instant process can be conducted over wide ranges of temperature, concentration of the alkaline solution, type of tin-containing materials, and concentrations of the activated carbon and oxygen reaction promoter combinations. For optimum results, however, it is preferred that the reaction be conducted at a temperature between about 150° F. and the boiling point of the solution, and that the activated carbon and oxygen supplying agent reaction promotor combination be present in an amount sufficient to provide a flow rate of from about 0.02 to 0.4 liters oxygen/min./liter of solution and that the activated carbon be employed in an amount of from 1-15% by weight of metallic tin. Additionally, for best results the metallic tin should be present in an amount of from 50 to 500 grams of tin/liter of solution. It is also preferred that the reaction be conducted by conducting downwardly through a bed of a relatively uniform mixture of the tin-containing material and the activated carbon the aqueous alkaline solution in countercurrent flow to an upwardly ascending stream of oxygen, although any other method well known to those skilled in the art may also be utilized for conducting this reaction.

The resulting solution of alkali metal stannate may either be used as is, or may be treated to obtain the alkali metal stannates in crystalline form through the use of methods well known to those skilled in the art.

Other objects, features, and advantages of the instant invention will become apparent to the skilled artisan upon examination of the following detailed description of the present invention, taken in conjunction with the figures of drawing, wherein:

DETAILED DESCRIPTION OF THE PREFERRED EMBODIMENTS

Figure 1:
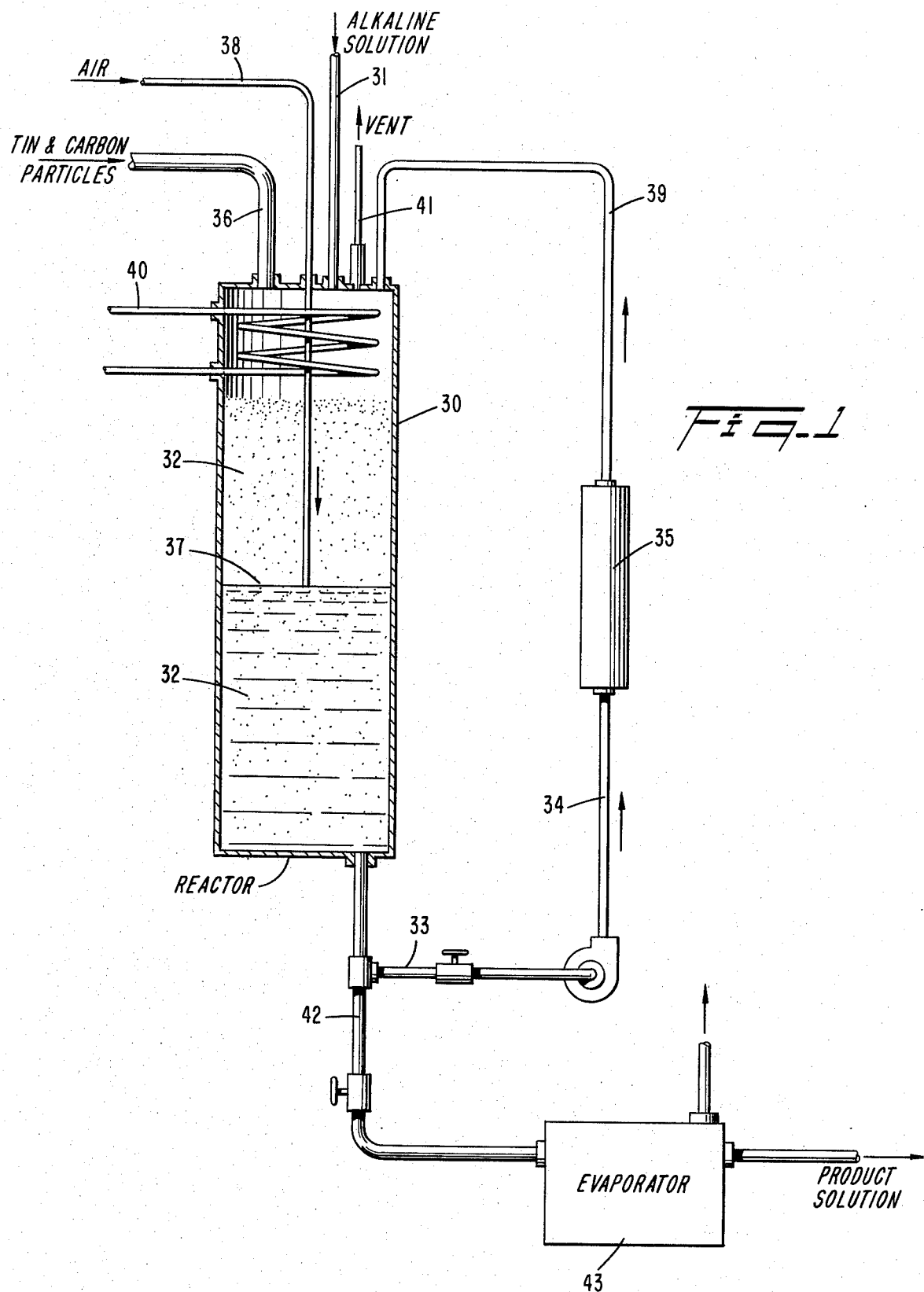
FIG. 1 is a schematic flow diagram of a preferred method for conducting the process of the instant invention.

As has been described above, the present invention is premised upon the discovery that a tin-containing material will readily react with an alkaline solution when the reaction is conducted at elevated temperatures in the presence of a reaction promotor comprising the combination of activated carbon and an oxygen supplying agent. While not wanting to be bound by any specific theory, it is believed that oxygen overcomes the passivation of the tin metal and the inhibitory effect on reaction rate resulting from this chemical phenomenon. The use of oxygen alone as a reaction promotor, however, as in the processes of the prior art, has been found to have a very minor effect on the overall rate of reaction. When oxygen is combined with activated carbon, as in the instant invention, it has been found that the reaction of tin metal with the alkaline solution proceeds readily and smoothly and at a greatly enhanced rate. Apparently, due to the exceedingly low solubility of oxygen in basic systems, reaction of molecular oxygen with the metal surface without the presence of activated carbon is unfavorable. With activated carbon, however, reaction occurs readily. Due to its highly porous and absorptive nature, the activated carbon apparently functions at elevated temperatures as an oxygen absorber and transport vehicle which facilitates the transfer of oxygen or possibly an active oxygen intermediate to the metal surface. As a consequence, a highly reactive form of tin is produced which readily reacts with the alkaline medium to produce the desired alkali metal stannate.

As a result of this apparent catalytic function of the activated carbon and oxygen reaction promotor combination at elevated temperatures, reaction rates significantly greater than those exhibited in conventional direct contact type processes for the production of these compounds are attainable. Moreover, due to the highly porous and absorptive nature of the activated carbon of the reaction promotor combination, the activated carbon apparently functions as an in situ purification agent which removes inorganic and organic impurities from the surrounding aqueous media. As a result, a solution of an alkali metal stannate is obtained which possesses a much lower concentration of impurities than is attainable with conventional processes for the production of this compound without extensive purification procedures.

A preferred application of the instant invention is in the preparation of the alkali metal stannates, such as sodium and potassium stannate since the prior art methods for the preparation of these compounds have been particularly complex, costly, and time consuming.

The aqueous solutions used in preparation of the foregoing alkali metal stannates comprise an aqueous solution of an alkali metal hydroxide which contributes the anionic moiety of the alkali metal stannate. The concentration of the aqueous alkali metal hydroxide solution can vary over relatively wide limits from relatively dilute to relatively concentrated solutions. The particular concentration of the alkali metal hydroxide solution used depends significantly on the particular alkali metal. That is, potassium hydroxide solutions can dissolve significantly larger amounts of potassium stannate than a sodium hydroxide solution can of sodium stannate. In each instance, commercial utilization of the present invention will generally dictate that the solution be as concentrated as possible to achieve a correspondingly higher degree of stannate saturation. Optimum rates of production may be obtained, however, by using an aqueous solution having a concentration of up to about 28 percent by weight of potassium hydroxide and up to about 10 percent by weight of sodium hydroxide. The amount of tin in the solution is generally in an amount of from about 50 to 500 or more grams of tin per liter of solution.

The tin-containing material will generally comprise commercially available grades of metallic tin, e.g., grade A tin, although lower grades of tin metal from Malaya, Bolivia, or Nigeria, and tin ores leachable by the hydroxide solution may be utilized where the desired end use can tolerate a higher level of impurities. Tin scrap, such as tin plate, stamping waste, or other tin plated steel articles may also be employed as the tin-containing material. Whatever the source of the tin-containing material selected, however, it is desirable that the tin-containing material have as large a surface area as possible, in order to increase the available contact area of the tin-containing material with the aqueous hydroxide solution and the activated carbon and oxygen reaction promotor combination. Preferably, the tin-containing material has a specific surface area of at least about 0.1 cm$^2$/gram, and most preferably between about 0.5 and 15 cm$^2$/gram. A preferred tin-containing material comprises "mossy" tin metal having a surface area within the aforementioned ranges. As is well known to those skilled in the art, mossy tin is a finely divided form of tin formed by pouring molten tin into water.

The activated carbon component of the reaction promotor will also generally be in a granular or otherwise subdivided state in order to increase the amount of surface area available to participate in oxygen transfer with the tin metal. Activated carbon having a broad range of particle sizes such that from 60–75% will pass through a 325 mesh screen and having a minimum surface area of about 1,000 1,300 m$^2$/gram has been found to be satisfactory. Examples of commercially available activated carbons suitable for use in the present process comprise RB and BL Pulverized Activated Carbon, available from the Activated Carbon Division of the Calgon Corporation. The RB activated carbon comprises a coal based activated carbon powder having a broad distribution of particle sizes such that 60–75% pass through a 325 mesh screen, a total surface area of from 1,100–1,300 m$^2$/gram, a minimum iodine member of 1,070, and a minimum molasses number of 400. The BL activated carbon similarly comprises a coal based activated carbon having a particle size distribution such that 65–75% passes through a 325 mesh screen, a total surface area of a minimum of 1,000–1,100 m$^2$/gram, a minimum iodine number of 1,000, and a minimum molasses number of 230.

The molecular oxygen supplying agent and activated carbon components of the reaction promotor are utilized in an amount sufficient to promote the production of the desired alkali metal stannate from the tin metal and the alkali metal hydroxide solution. Typically, the activated carbon component of the reaction promotor will be employed in an amount of from about 1 to 15 percent by weight of the metallic tin, and the oxygen supplying agent will be utilized in an amount sufficient to provide from about 0.02 to 0.4 liters of oxygen per minute per liter of solution. It has been found, however, that the rate of reaction of the tin metal with the aqueous alkali metal hydroxide solution is a direct function of the quantity of activated carbon and mlecular oxygen supplying agent present, and that larger amounts of these components result in enhanced reaction rates. Accordingly, larger amounts of the activated carbon and oxygen supplying agents within the aforementioned ranges or even higher may be employed. In the preferred embodiment, the activated carbon component will generally be used in an amount of from about 2 to 12 percent by weight of metallic tin, and the oxygen supplying agent will generally be used in an amount sufficient to provide from about 0.04 to 0.3 liters of oxygen per minute per liter of solution. It is to be emphasized, though, that since the effect of oxygen is catalytic when used in combination with activated carbon, even the presence of a very small amount of each of these components is beneficial.

It should be understood that the reaction rate depends at least in part on the rate of diffusion of oxygen through a film of solution surrounding the tin metal and the ability of the particular activated carbon employed to transfer the oxygen to the metal surface. Accordingly, the optimum amounts of oxygen and activated carbon are determined by the specific combination of reaction conditions employed, e.g., solution flow rate, active metal surface, solution temperature, viscosity and density of the solution, particular type of activated carbon, particular type of oxygen supplying agent and the concentration of reactants and products therein. The optimum quantities of each of the components of the reaction promotor can be routinely determined for any given set of conditions by empirical tests.

The oxygen which comprises a component of the reaction promotor of the instant invention may be provided by any oxygen supplying agent well known to those skilled in the art. Typical examples of such agents include oxygen gas, admixtures of oxygen with other inert gases, air, or some other convenient source of oxygen. In the preferred embodiment, the oxygen supplying agent will generally comprise air, and will be utilized at a flow rate of from about 0.1 to about 2.0 preferably from about 0.2 to about 1.5 liters of air per minute per liter of aqueous alkali metal hydroxide solution.

In order to achieve commercially desirable rates of reaction, the aqueous alkali metal hydroxide solution is contacted with an excess of metallic tin in the presence of the reaction promotor combination at elevated temperatures. Broadly, the contacting reaction can be conducted at a temperature of from about 150° F. to about the boiling point of the aqueous solution. At temperatures much below this lower limit, the rate of reaction becomes slower than is commercially practical. In fact, the reaction rate is so slow at room temperature, even with the reaction promotor of the instant invention, that a commercially negligible amount of alkali metal stannates are obtained even after extended contact periods. Accordingly, it is preferred to operate at temperatures within the aforementioned range.

Figure 3:
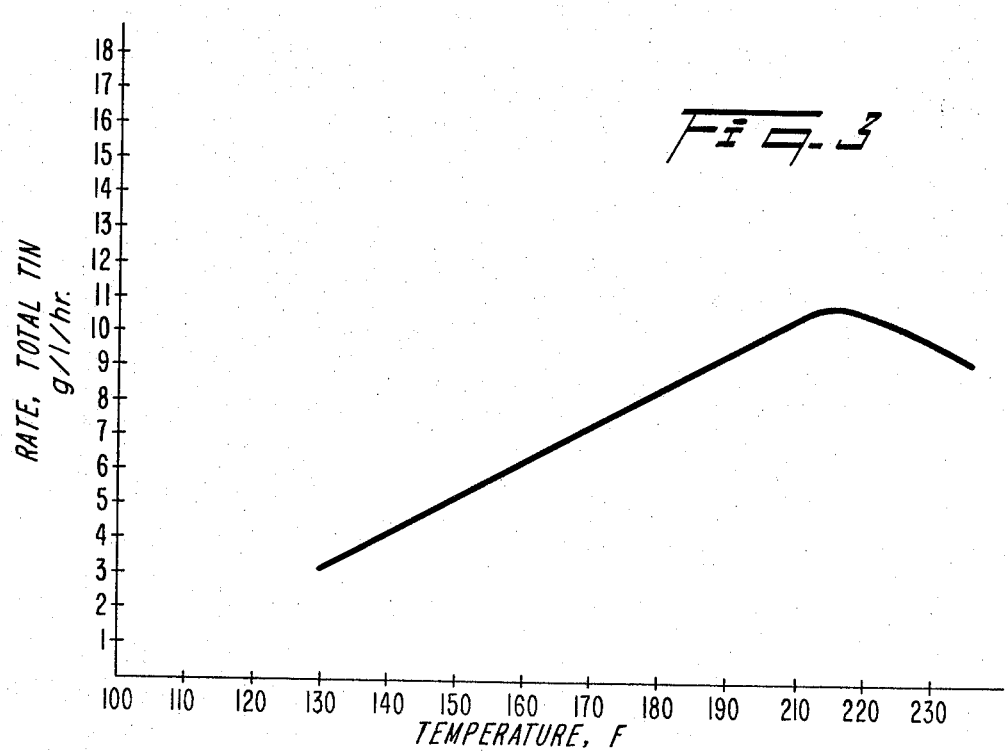
FIG. 3 is a graph demonstrating the effect of temperature on potassium stannate production.

Enchanced rates of reaction and preferential formation of alkali metal stannates can be obtained by operating at temperatures from about 150° F. to about 235° F. At temperatures above 150° F. the rate of reaction increases sharply. At temperatures much above 230° F., the rate of reaction begins to fall off sharply. The temperature at which the rate of reaction achieves a maximum will vary slightly according to the particular alkali metal stannate being made. For potassium stannate, the maximum rate of reaction occurs at about 215° F., and accordingly it is particularly preferred that the preparation of this compound be conducted at this temperature. A temperature profile for the production of potassium stannate is illustrated in FIG. 3.

A further advantage of operating within the aforementioned temperature range is that production of alkali metal stannates is favored by higher temperatures and increased concentrations of oxygen. At temperatures above 150° F., production of alkali metal stannates is favored, whereas at temperatures below this value production of alkali metal stannites are preferred. Larger concentrations of oxygen also favor the production of alkali metal stannates for a given temperature. Accordingly, by appropriately adjusting the oxygen and temperature parameters of the subject process alkali metal stannates can be preferentially produced, with only an inconsequential amount of alkali metal stannites production.

The present process can also be conducted over a wide range of pressure conditions, including subatmospheric, atmospheric and superatmospheric pressures. For reasons of simplicity, the instant process is generally conducted at atmospheric or slightly elevated pressures.

Any method well known to those skilled in the art can be employed for contacting the aqueous alkali metal hydroxide solution with the excess of metallic tin and reaction promotor combinations. For example, the present process can be conducted as a continuous or batch operation, as a fixed bed process, or even as a fluidized bed process. The contact time between the metallic tin, aqueous solution, and reaction promotor necessary to produce the alkali metal stannates in the process of the present invention will vary according to the particular method by which the various materials are contacted. Generally, the aqueous solution, metallic tin, and reaction promotor will be contacted for an amount of time sufficient to produce an aqueous solution containing at least 60 to 80 grams per liter of solution of tin (in the form of the stannate), preferably as close to saturation as possible. For a fixed-bed type of contacting operation, contact times will typically comprise from about 6 to about 24 hours.

A preferred form for conducting the present invention is illustrated in FIG. 1, which for the sake of explanation will be described with reference to the production of potassium stannate. It is to be emphasized, however, that this same procedure is equally advantageous, with minor modification, to the production of sodium stannate. Referring to this drawing, a suitable aqueous solution of potassium hydroxide, such as for example one having a concentration of about 25 weight percent potassium hydroxide is pumped into reactor 30 through line 31. The reactor 30 will typically be manufactured of a corrosion resistant material, such as for example a steel tank lined with polytetrafluoroethylene. The reactor 30 is packed to approximately one-half to three-quarters of its height with a bed 32 comprising a homogeneous admixture of activated carbon and mossy tin or a similar form of tin which has a high ratio of surface area to weight and allows sufficient free space for efficient circulation of the potassium hydroxide solution therethrough. Make-up of tin and carbon particles may be introduced into the reactor 30 via line 36. Alternatively, if the activated carbon has a sufficiently small particle size, the activated carbon may be introduced into the reactor 30 by forming a slurry with the potassium hydroxide solution and trickling it over the bed of metallic tin. The potassium hydroxide solution is added to the reactor 30 in an amount sufficient to fill about half the net reactor space containing the tin metal and activated carbon bed, leaving a substantial portion, for example, about one-half of the bed exposed above liquid level 37.

The reactions in reactor 30 can be carried nearly to completion with only a small amount of potassium hydroxide solution by recirculating the solution through the reactor at a suitable temperature. Recirculation can be affected via lines 33, 34, and 39 to the top of reactor 30. The aqueous solution may be further heated or cooled in heat exchanger 35 so as to maintain the desired reaction temperature in reactor 30. After being sprayed into the reactor 30, the solution percolates or trickles down through the mass of tin and activated carbon particles 32 until it reaches liquid level 37 which is maintained in an intermediate portion of the reactor. An oxygen supplying agent such as air may be introduced into reactor 30 via line 38 at a point which is preferably above the liquid level 37, and is conducted upwardly through the tin metal—activated carbon mixture 32 countercurrently to the downwardly descending stream of potassium hydroxide solution. A plurality of such lines may be used to enhance the even distribution of the oxygen supplying agent across the vessel. Alternatively, air may be bubbled up into the reactor 30 from the bottom.

After passage through the tin-carbon mixture 32 in countercurrent flow to the downwardly descending potassium hydroxide or other solution, the air will be removed from the top of the reactor 30 via vent 41. Vapors present in the vapor space above the tin and activated carbon bed are desirably refluxed by condenser 40. The refluxing condenser 40 can alternatively be external to reactor 30 in a separate vessel connected to the vapor space of the reactor.

After adequate circulation through the reactor, for example, after a total contact time of between about 6 to 24 hours or longer, a potassium stannate containing solution is withdrawn from reactor 30 via line 42. At this stage, the solution will typically contain from up to about 970 grams per liter of solution of potassium stannate.

The potassium stannate solution may be used as is, such as, for example, in a tin plating solution. Alternatively, the solution may be vacuum evaporated or concentrated in evaporator 43. In evaporation, the potassium stannate precipitates out of solution any may be recovered as a dry powder. The hydroxide-containing solution may be recycled for use in reactor 30.

In order to more fully describe the present invention, the following Examples are presented which are intended to be merely illustrative and not in any sense limitative of the invention.

All parts, percentages and ratios in the Examples, as well as in other parts of the specification and claims, are by weight unless otherwise specified.

EXAMPLE I

A series of experiments under variable air flow rates is conducted to determine the effect of oxygen concentration on the rate of potassium stannate production. A round bottom flask, equipped with a heater, is filled with a reaction mixture comprising 500 grams of mossy tin (containing greater than 99.9 percent by weight Sn; 0.0061 percent by weight Fe; 0.0247 percent by weight Pb; 0.007 percent by weight Sb; and 0.0181 percent by weight Cu), 350 grams of KOH (assayed as an 86 percent KOH) dissolved in one liter of distilled water, and 30 grams of activated carbon marketed under the trade designation RB Pulverized Activated by the Calgon Corporation. The flask is fit with an air dispersion head fabricated from a 5 micron sintered metal filter plate material obtained from Pall Trinity Metals Company through which air is injected into the reaction mixture. A lime scrubber is installed in the air line in order to reduce carbon dioxide contamination, and 2 manometers are installed to monitor air flow. The flask is then fit with a condenser and heated to a constant temperature of 215° F.

The air flow rate utilized in each run is varied over the range from 0.2 to 1.1 liters air per minute per liter of solution which corresponds to 0.04 to 0.22 liters of oxygen per minute per liter of solution. After reaction for an equivalent length of time, the resulting solutions are analyzed for potassium stannate and potassium stannite content. The concentration of each of these compounds is then plotted versus air flow rate.

Figure 2:
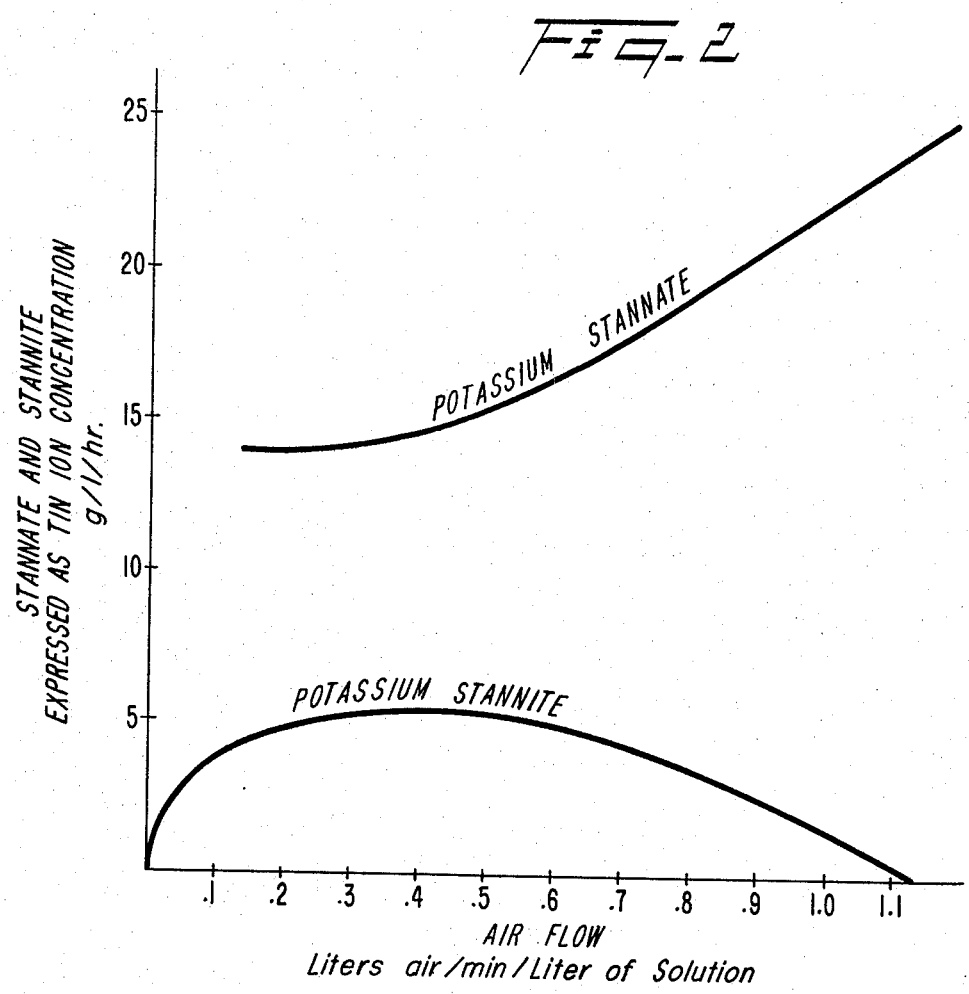
FIG. 2 is a graph demonstrating the effect of air flow rate on potassium stannate and stannite production.

The results of this series of experiments is illustrated in FIG. 2. As illustrated therein, the upper curve is a differential curve corresponding to the amount of potassium stannate obtained at each air flow rate. The bottom curve is a similar differential curve corresponding to the amount of potassium stannite found at each air flow rate. As can be clearly seen in FIG. 2, the production of potassium stannate, all other variables being maintained constant, is favored by the presence of larger concentrations of oxygen, and the higher the concentration of oxygen present within the aforementioned range the lower the stannite concentration in the resulting product solution. By appropriately controlling the rate of air flow, therefore, production of potassium stannate can be preferentially favored with almost the total exclusion of potassium stannite production.

EXAMPLE II

The procedures of Example I are repeated on similar changes in which the amount of carbon is varied from about 4 to 8 weight percent of the tin utilized. Analysis of the resulting solutions formed during the same reaction times shows that increased amounts of carbon yield increased amounts of potassium stannate and that even the least amount of carbon used yields a greater amount of potassium stannate that is obtained in a conventional direct contact method.

EXAMPLE III

A temperature optimization study for the production of potassium stannate is conducted, following the procedure of Example I. A series of runs is conducted under variable temperatures employing a reaction mixture comprising 500 grams of the mossy tin of Example I, 350 grams of KOH (assayed as 86 percent KOH) dissolved in 1 liter of distilled water, and 20 grams of RB activated carbon. The air flow was held constant at 0.4 liters air per minute per liter of solution (which corresponds to 0.08 liters of oxygen per minute per liter of solution).

The results of this series of experiments is shown in FIG. 3. As seen therein, at a constant activated carbon and oxygen concentration, production of potassium stannate increases linearly up to a maximum at 215° F. At temperatures above 230° F., and below 150° F., a severe reduction in reaction rate occurs. Even with the reaction promotor combination of the instant invention, at room temperature the rate of reaction is so slow as to correspond essentially to no reaction at all.

EXAMPLE IV

Following the procedure of Example I and utilizing the same mossy tin employed therein, a solution of potassium stannate is produced. This solution is thereafter evaporated in a rotary evaporator at 25 inches Hg and a temperature ranging from 180° to 212° F. to isolate the potassium stannate. After oven drying at 70° C., the isolated potassium stannate product is analyzed for impurities. The isolated product is found to contain only 0.0012 weight percent Fe; 0.0019 weight percent Sb; 0.0006 weight percent Pb; and only 0.0002 weight percent Cu. A comparison of the aforementioned concentration of contaminants with the contaminants initially present in the mossy tin charge, as well as the amount of metallic impurities eluted from the activated carbon after several runs, indicates that the activated carbon component of the reaction promotor also functions as an in situ purification agent for removing inorganic and organic impurities as well as a co-catalyst in the reaction.

After analysis of the isolated potassium stannate, a number of steel plates having an area of 50 cm$^2$ and a thickness of 0.1 millimeters are electroplated using a portion of the isolated potassium stannate product in order to evaluate the suitability of the instant process for use in the production of electroplating solutions. Each plate is electroplated using a solution comprising 8 ounces per gallon of the isolated potassium stannate product, and 3 ounces per gallon of free potassium hydroxide. An electrical current having an amperage of from 1.3 to 2.4 amps and a current density of from about 24.2 to 44.6 amps/ft$^2$ is passed through the above-described electroplating solution for a period of time of from about 2 to 5 minutes at a temperature of about 81° to 82° C. Each of the steel plates so treated is found to have a mirror bright finish and of superior quality.

EXAMPLE V

Following the procedure of Example I, sodium stannate is produced by reacting 500 grams of the mossy tin of Example I, 200 grams of a 50 percent solution of sodium hydroxide, dissolved in 1 liter of distilled water, and 30 grams of RB activated carbon at a variable temperature ranging from about 165° to 215° F. Air flow is maintained at a constant rate of 1.5 liters air per minute per liter of solution (which corresponds to 0.3 liters of oxygen per minute per liter of solution). After 6.0 hours of reaction, the resulting solution is found to contain 61.89 grams per liter total tin, as sodium stannate, corresponding to a rate of sodium stannate production of 10.3 grams per liter per hour, and only 4.55 grams per liter sodium stannite. The sodium stannate product shows significantly lesser amounts of metallic impurites than the mossy tin starting materials. By increasing the amount of oxygen and/or using an oxygen purge, the amount of sodium stannite can be even further reduced.

By way of comparison, the foregoing experiment is repeated, but without the reaction promotor combination of the instant invention using only air. After an equivalent reaction time, a negligable amount of sodium stannate is produced.

The foregoing Examples clearly demonstrate the suitability of the instant process for the production of alkali metal stannates. As can be seen from these Examples, by reacting a tin-containing material at elevated temperatures with an aqueous alkali metal hydroxide solution in the presence of the reaction promotor combination of the instant invention, significantly enhanced rates of production are obtained. Moreover, in contrast to the conventional processes for the production of these compounds, the alkali metal stannates produced by the instant method exhibit a significantly lower amount of impurities due to in situ purification by the activated carbon component of the reaction promotor. Accordingly, the present invention provides a much needed contribution to the art of alkali metal stannate manufacture.

While the invention has now been described in terms of certain preferred embodiments, and illustrated by numerous examples, the skilled artisan will readily appreciate that various modifications, substitutions, omissions, and changes may be made without departing from the spirit thereof. Accordingly, it is intended that the scope of the present invention be limited solely by the scope of the following claims.

What is claimed is:

1. A catalytic process for the production of alkali metal stannates, comprising the steps of:
   (a) contacting at a temperature between about 150° and 235° F. an aqueous alkali metal hydroxide solution with an excess of metallic tin in the presence of activated carbon in an amount of from about 1 to 15 percent by weight of said metallic tin;
   (b) passing a molecular oxygen supplying agent selected from the group consisting of oxygen and air through said solution in the presence of said metallic tin and said activated carbon at a rate sufficient to promote the conversion of said metallic tin to alkali metal stannate and to form an alkali metal stannate solution, said rate being sufficient to provide from about 0.02 to 0.4 liters of oxygen per minute per liter of solution; and
   (c) recovering the resulting alkali metal stannate solution.

2. The process of claim 1, wherein said metallic tin is in a form having a specific surface area of at least about 0.1 cm²/gram.

3. The process of claim 2, wherein said metallic tin has a specific surface area of from about 0.5 to 15 cm²/gram.

4. The process of claim 1, wherein said alkali metal stannate is potassium stannate and said alkali metal hydroxide solution is a potassium hydroxide solution.

5. The process of claim 1, wherein said alkali metal stannate is sodium stannate and said alkali metal hydroxide solution is a sodium hydroxide solution.

6. The process of claim 1, wherein said activated carbon is utilized in an amount of from about 2 to 12 percent by weight of metallic tin, and said molecular oxygen supplying agent is utilized in an amount sufficient to provide from about 0.04 to about 0.3 liters of oxygen per minute per liter of solution.

7. The process of claim 6, wherein said molecular oxygen supplying agent is air.

8. The process of claim 1, wherein said alkali metal hydroxide solution is contacted with said metallic tin in the presence of said activated carbon and molecular oxygen supplying agent for an amount of time sufficient to produce an alkali metal stannate solution containing at least about 60 to about 80 grams stannate per liter of solution.

9. The process of claim 8, wherein said alkali metal hydroxide solution is contacted with said metallic tin in the presence of said activated carbon and molecular oxygen supplying agent for an amount of time sufficient to produce a saturated alkali metal stannate solution.

10. A catalytic process for the production of alkali metal stannates selected from the group consisting of sodium and potassium stannates, comprising the steps of:
    (a) intimately contacting an aqueous alkali metal hydroxide solution selected from the group consisting of sodium and potassium hydroxide solutions with an excess of metallic tin particles having a specific surface area of at least 0.1 cm²/gram in the presence of activated carbon at a temperature of from about 150° to about 235° F. by feeding said alkali metal hydroxide solution downwardly through a bed of said metallic tin particles containing from about 1 to about 15 percent by weight of said activated carbon in an amount sufficient to immerse at least a portion of said bed;
    (b) simultaneously feeding a stream of molecular oxygen supplying agent selected from the group consisting of oxygen and air upwardly through said bed in countercurrent flow to said alkali metal hydroxide solution from the immersed portion of said bed to the upper portion of said bed at a rate sufficient to promote the conversion of said metallic tin to alkali metal stannate, said rate being sufficient to provide from about 0.02 to 0.4 liters of oxygen per minute per liter of solution, and for a time sufficient to produce an alkali metal stannate solution containing at least about 60 to about 80 grams stannate per liter of solution; and
    (c) recovering the resulting alkali metal stannate solution.

11. The process of claim 10, wherein said bed contains from about 2 to about 12 percent by weight of activated carbon and said molecular oxygen supplying agent has a feed rate equivalent to from about 0.04 to about 0.2 liters of oxygen per minute per liter of solution.

12. The process of claim 11, wherein said molecular oxygen supplying agent is air.

* * * * *